United States Patent [19]

Ubel

[11] 4,142,700
[45] Mar. 6, 1979

[54] ARRANGEMENT FOR OPTIMIZING THE RUNNING SPEED OF A TRACK-BOUND VEHICLE

[75] Inventor: Helmut Ubel, Stuttgart, Fed. Rep. of Germany

[73] Assignee: International Standard Electric Corporation, New York, N.Y.

[21] Appl. No.: 815,627

[22] Filed: Jul. 14, 1977

[30] Foreign Application Priority Data

Jul. 14, 1976 [DE] Fed. Rep. of Germany ....... 2631540

[51] Int. Cl.² .......................................... B61L 3/16
[52] U.S. Cl. ............................. 246/182 B; 246/182 C
[58] Field of Search ........... 246/182 B, 182 C, 187 B, 246/187 C, 167 R, 63 C

[56] References Cited

FOREIGN PATENT DOCUMENTS

| | | |
|---|---|---|
| 968449 | 5/1975 | Canada ................................. 246/187 C |
| 1237612 | 3/1967 | Fed. Rep. of Germany ....... 246/182 B |
| 2433666 | 1/1976 | Fed. Rep. of Germany ....... 246/182 B |

*Primary Examiner*—Trygve M. Blix
*Assistant Examiner*—Reinhard J. Eisenzopf
*Attorney, Agent, or Firm*—John T. O'Halloran; Alfred C. Hill

[57] ABSTRACT

The running speed of a track bound vehicle whose movement is normally determined by an automatic control system that preassigns speeds and braking curves and accelerations up to the permissable speed at a predetermined rate or with maximum propulsion power is optimized by an additional circuit carried by the vehicle which calculates a predetermined point on a coasting initiation curve from data communicated to the vehicle and which switches off the propulsion power of the vehicle when the actual speed of the vehicle exceeds the predetermined point.

3 Claims, 3 Drawing Figures

ARRANGEMENT FOR OPTIMIZING THE RUNNING SPEED OF A TRACK-BOUND VEHICLE

BACKGROUND OF THE INVENTION

The present invention relates to an arrangement for optimizing the running speed of a track-bound vehicle whose movement is determined by an automatic control system preassigning speeds and braking curves, and which is accelerated up to the permissible speed at a predetermined rate or with maximum propulsion power.

In continuous automatic train control it is common practice to preassign to the vehicles maximum permissible speeds and braking curves which a fixed computer system determines from the train-specific and line data. If the speed of the train is lower than the maximum permissible speed, the train is accelerated automatically — first at a predetermined rate and later, when this is no longer possible for power reasons — with maximum power until the maximum permissible speed has been reached. The predetermined acceleration rate is as high as possible to achieve a short running time.

This control method is based on the assumption that predominantly long track sections are travelled at the maximum permissible speed. This is not always the case, however. On the contrary, it frequently happens that only a short portion of the line ahead is free, e.g. when a train with a high preassigned acceleration rate and a high maximum speed must follow a slower train. The resulting unnecessary acceleration and braking processes of the faster train lead to a high energy consumption and rapid wear of brakes and switch gear.

These disadvantages could be largely overcome by introducing a coasting phase as a third possible running condition besides the acceleration phase and the braking phase. In an article by J. Glimm, AET (30)-1975, a vehicle control system is discussed which uses a coasting phase to achieve oscillation-free control. With the "near-optimum control of train separation" described there, the nominal speed is reduced in a coasting phase and a subsequent braking phase with fixed retardation. However, since the system determines the nominal speeds from the distance to a phantom vehicle ahead which is simulated on a computer, it cannot be used in continuous automatic train control. Moreover, the article deals exclusively with automatic control theory and makes no proposals for the realization of a near-optimum control of train separation.

SUMMARY OF THE INVENTION

The object of the invention is to provide an arrangement which permits the introduction of a coasting phase and, possibly, of additional phases such as "reduced propulsion power" or "low braking power" in continuous automatic train control to optimize the acceleration and braking actions of the vehicles with regard to running time on the one hand and energy consumption and wear of brakes on the other hand, thereby cutting operating costs.

The arrangement according to the invention is characterized in that the vehicle carries an additional circuit which calculates coasting initiation curves running below the braking curves in the speed-distance diagram from the data communicated to the vehicle to determine the braking curve and, when the actual speed of the vehicle exceeds a coasting initiation curve, causes either the propulsion of the vehicle to be switched off or the propulsion power to be reduced or the vehicle to be braked with a low braking force.

This allows the energy consumption of an automatically controlled vehicle to be considerably reduced at low cost and with an only slight prolongation of the running time, particularly on lines with many speed restrictions or heavy freight traffic; this results in a corresponding reduction of the wear of brakes and switch gear.

A development of the arrangement according to the invention is characterized in that the effect of the additional circuit can be switched on and off manually and/or by the automatic control system, and that means are provided which perform such switching-on and -off automatically when the actual speed falls below a minimum or when a station stop lies immediately ahead. This makes it possible to reduce the running time to a minimum, e.g. to make up for lost time.

Another development of the arrangement according to the invention is characterized in that there is provided an additional subcircuit which, if the braking curve in the speed-distance diagram is flat, causes the associated coasting initiation curve to be raised in its portion running in the higher speed range.

By this measure, the effect of the additional circuit is adapted to railway service requirements at low speeds.

A further development of the arrangement according to the invention is characterized in that the coasting initiation curves are straight lines, that the additional circuit consists essentially of an adder followed by a subtractor and a relay controlled via a transistor, that the adder connects the potentials obtained during the braking-curve calculation in the vehicle or communicated to the vehicle and representing target distance and target speed with a vehicle-specific constant determining the slope of the straight-line coasting initiation curve, that the subtractor subtracts from the potential value derived from the interconnection a potential value proportional to the actual speed, that, when the potential value proportional to the actual speed exceeds the potential value obtained by the interconnection, the transistor is turned on and thus operates the relay, which causes the propulsion of the vehicle to be switched off via contacts and drives one or more display units, and that means are provided which cause a hysteresis in the switching behavior of the additional circuit to prevent the propulsion of the vehicle from being switched on and off too often.

BRIEF DESCRIPTION OF THE DRAWING

A preferred embodiment of the arrangement according to the invention will now be described in more detail with reference to the accompanying drawings, in which.

DESCRIPTION OF THE PREFERRED EMBODIMENT

Figure 1:
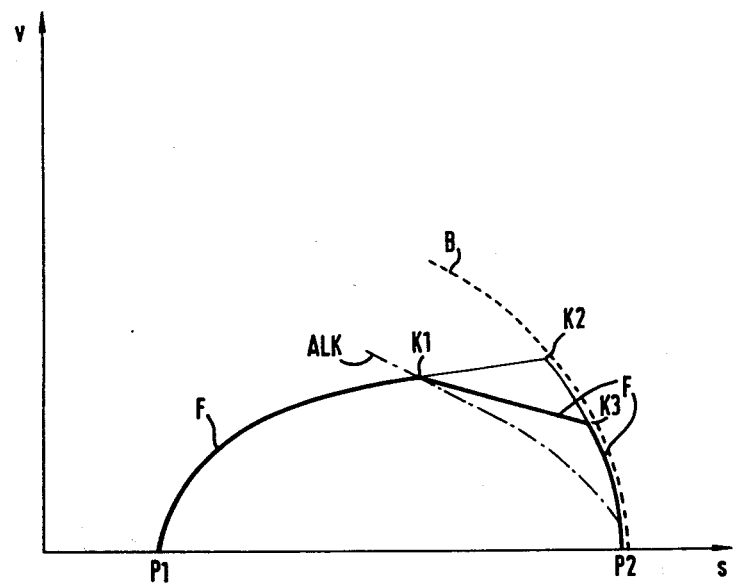
FIG. 1 shows the effect of the arrangement according to the invention in a speed-distance diagram during a movement between two stopping points.

In the coordinate system shown in FIG. 1, where distances s are plotted along the abscissa and speeds v along the ordinate, there are shown a speed-distance curve F of a vehicle, a preassigned braking curve B, and a coasting initiation curve ALK, which is parabolic in this case. The speed-distance curve F shows the actual speed of a vehicle over the distance from a stop at the point P1 to a stop at the point P2. Without the arrangement according to the invention, the speed-distance curve would run via a break K1, where it intersects the coasting initiation curve, to a break K2 (thin continuous line) and from there along the braking curve B to the stopping point P2. In other words: The vehicle would accelerate at the maximum rate until it reaches the braking curve, and then would brake sharply. With the arrangement according to the invention, the propulsion is already switched off when the vehicle reaches the coasting initiation curve at the break K1, which, as a rule, results in a deceleration apparent from the slope of the speed-distance curve F. As a consequence, the braking curve is reached later and at a considerably lower speed level at a break K3. This saves energy necessary for acceleration and reduces the braking period. A possible disadvantage lies in the longer running time.

Instead of switching off the propulsion, the propulsion power may be reduced or the vehicle may be braked with a low braking force.

Figure 2:
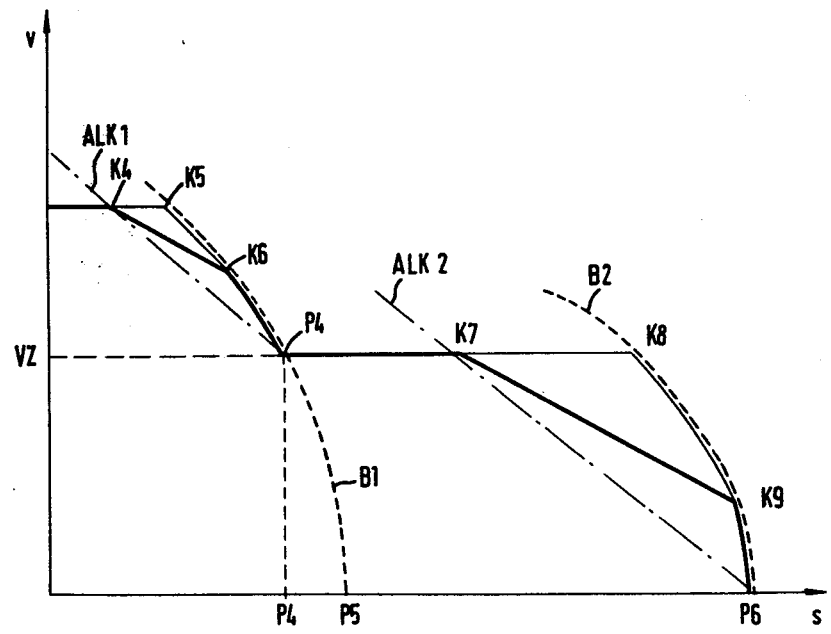
FIG. 2 shows the effect of the arrangement according to the invention in a speed-distance diagram as a vehicle is being slowed down to a target speed and then brought to a stop.

FIG. 2 shows the effect of the arrangement according to the invention in a case where the vehicle is braked from the maximum permissible speed first to a target speed vz at a point P4 and then, after having travelled a further distance, to a stop at a point P6. As coasting initiation curves, straight lines ALK1, ALK2 have been chosen in this case. At the maximum permissible speed the propulsion of the vehicle is switched off at a break K4, the intersection of the speed-distance curve F and the first coasting initiation curve ALK1. A first braking curve B1 is therefore reached only at a break K6 — at the maximum permissible speed it would be reached at a break K5 — and instead of being braked along this first parabolic braking curve up to the vertex P5 and thus stopped, the vehicle, after reaching a target point P4, travels on at a lower speed, the target speed vz, up to a break K7, the intersection of the speed-distance curve and the second coasting initiation curve ALK2. From there, as in the case shown in FIG. 1, the movement continues not to a break K8 at a constant speed, but, with the propulsion switched off, to a break K9 on a second braking curve B2 and along this second braking curve B2 to a stop at the point P6.

Figure 3:
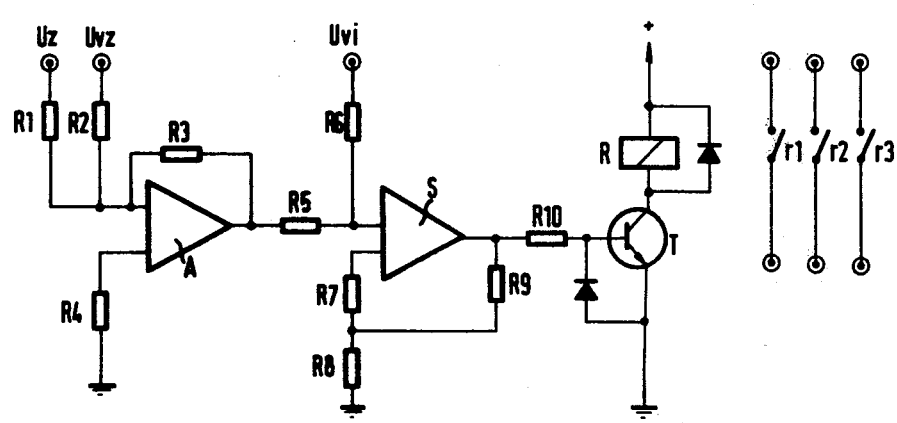
FIG. 3 shows a preferred embodiment of the additional circuit.

FIG. 3 shows an embodiment of the additional circuit of the arrangement according to the invention. An adder A connects a potential Uz representing the target distance and a potential Uvz representing the target speed, which potentials are taken from a circuit calculating the braking curve, with a vehicle-specific constant given by resistance ratios R1/R3 and R2/R3, respectively.

The adder A is followed by a subtractor S which subtracts a potential Uvi representing the actual speed from the output potential of the adder A. When the potential corresponding to the actual speed exceeds the output potential of the adder A, positive potential will appear at the output of the subtractor S, and a following transistor T which operates a relay R will turn on. This causes the vehicle propulsion to be switched off via contacts r1 to r3 and drives two visual display units (not shown). To prevent the propulsion from being switched on and off too often when the potential at the output of the adder A is approximately equal to that representing the actual speed, feedback via a resistor R9 is employed which causes a hysteresis in the switching behavior of the subtractor S.

What is claimed is:

1. An arrangement for optimizing the running speed of a track bound vehicle whose movement is normally determined by an automatic control system preassigning a speed and a braking curve and which is accelerated up to said preassigned speed at a predetermined rate or with maximum propulsion power comprising:

an additional circuit carried by said vehicle to calculate a predetermined point on a coasting initiation curve from data communicated to said vehicle and to switch off propulsion power of said vehicle when the actual speed of said vehicle exceeds said predetermined point;

said additional circuit including first means coupled to a first potential representing a target distance and a second potential representing a target speed, said first means producing at its output a third potential representing said predetermined point, and second means coupled to said output of said first means and a fourth potential representing the actual speed of said vehicle, said second means switching off propulsion power of said vehicle when said fourth potential exceeds said third potential.

2. An arrangement according to claim 1, wherein said second means includes a third means to produce a hysteresis in the switching behavior of said second means to prevent said propulsion power from being switched on and off too often.

3. An arrangement according to claim 1, wherein said coasting initiation curve is a straight line, said first means includes an adder having two inputs and said output of said first means, one of said two inputs of said adder being coupled to ground and the other of said two inputs of said adder being coupled to said first and second potentials by at least a portion of a voltage divider which determines the slope of said straight line, and said second means includes a subtractor having two inputs and an output, one of two inputs of said subtractor being coupled to said ground and the other of said two inputs of said subtractor being coupled to said output of said adder and said fourth potential, a transistor having a collector, a base coupled to said output of said subtractor, and an emitter coupled to said ground, relay means coupled to said collector activated by conduction of said transistor when said fourth potential is greater than said third potential to switch off said propulsion power, and a third means coupled between said output of subtractor and said one of said two inputs of said subtractor to produce a hysteresis in the switching behavior of said subtractor to prevent said propulsion power from being switched on and off too often.

* * * * *